United States Patent
Shin et al.

(10) Patent No.: US 9,631,071 B2
(45) Date of Patent: Apr. 25, 2017

(54) RUBBER COMPOSITION FOR TIRE TREAD AND TIRE MANUFACTURED BY USING THE SAME

(71) Applicant: HANKOOK TIRE CO., LTD., Seoul (KR)

(72) Inventors: SangMan Shin, Daejeon (KR); Jung Tae Kim, Daejeon (KR); Yun Su Choi, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 62 days.

(21) Appl. No.: 14/692,324

(22) Filed: Apr. 21, 2015

(65) Prior Publication Data

US 2015/0299436 A1  Oct. 22, 2015

(30) Foreign Application Priority Data

Apr. 21, 2014 (KR) ........................ 10-2014-0047484

(51) Int. Cl.
| | |
|---|---|
| *C08K 3/04* | (2006.01) |
| *C08L 7/00* | (2006.01) |
| *C08L 21/00* | (2006.01) |
| *B60C 1/00* | (2006.01) |
| *C09C 1/48* | (2006.01) |

(52) U.S. Cl.
CPC .............. *C08L 7/00* (2013.01); *B60C 1/0016* (2013.04); *C08K 3/04* (2013.01); *C09C 1/48* (2013.01); *C08K 2201/006* (2013.01); *C08K 2201/014* (2013.01)

(58) Field of Classification Search
CPC ................ C08K 3/04; C08K 2201/014; C08K 2201/005; C08K 2201/006; C08L 7/00; C08L 21/00; C08L 9/00; C08L 9/06
See application file for complete search history.

(56) References Cited

U.S. PATENT DOCUMENTS

| | | | |
|---|---|---|---|
| 4,154,277 A | 5/1979 | Sato et al. | |
| 5,700,845 A * | 12/1997 | Chung | .................. C08J 9/0066 521/121 |
| 5,780,537 A | 7/1998 | Smith et al. | |
| 5,877,250 A * | 3/1999 | Sant | .......................... C08K 3/04 423/445 R |
| 8,071,671 B2 * | 12/2011 | Hogan | .................. B60C 1/0016 524/495 |
| 2009/0163617 A1 * | 6/2009 | Wong | .................... B60C 1/0016 523/152 |
| 2011/0124792 A1 * | 5/2011 | Froehlich | .................. C09C 1/48 524/495 |

FOREIGN PATENT DOCUMENTS

| | | |
|---|---|---|
| EP | 2336228 A1 | 6/2011 |
| EP | 2607099 A1 | 6/2013 |
| EP | 2730608 A1 | 5/2014 |
| JP | 06-212024 | 2/1994 |
| JP | 2000-219778 A | 8/2000 |
| JP | 2010-163544 A | 7/2010 |
| JP | 2012-149132 A | 8/2012 |
| JP | 2012-149133 A | 8/2012 |
| JP | 2012-193307 A | 10/2012 |
| JP | 2014-024912 A | 2/2014 |
| KR | 2003042891 A * | 6/2003 |

OTHER PUBLICATIONS

Office Action issued in Japanese Pat. Appl. No. 2015-053613 received Feb. 23, 2016.
European Search Report, Application No. 15152033.5 dated Jul. 28, 2015.
Database WPI, Thomson Scientific, London, GB; AN 2013-F78484, XP002741478, & JP 2013 071970 A, Apr. 22, 2013.
Database WPI, Thomson Scientific, London, GB; AN 2008-D40119, XP002741479, & JP 2007 231177, Toyo Rubber Ind Co Ltd, Sep. 13, 2007.

* cited by examiner

*Primary Examiner* — Karuna P Reddy
(74) *Attorney, Agent, or Firm* — Marshall, Gerstein & Borun LLP

(57) ABSTRACT

Provided are a rubber composition for tire tread, which exhibits excellent cut and chip resistance and also exhibits excellent abrasion resistance and heat generation resistance performances that are in a trade-off relationship with the cut and chip resistance, and a tire produced using the rubber composition. The rubber composition for tire tread has excellent abrasion resistance and cut and chip resistance, and thus a tire produced using the rubber composition for tire tread can be suitably used in buses or trucks.

4 Claims, No Drawings

RUBBER COMPOSITION FOR TIRE TREAD AND TIRE MANUFACTURED BY USING THE SAME

CROSS-REFERENCE TO RELATED APPLICATION

This U.S. patent application claims the benefit of priority under 35 U.S.C. §119 of Korean Patent Application No. 10-2014-0047484, filed Apr. 21, 2014, the entire contents of which is hereby incorporated by reference for all purposes.

BACKGROUND

Field of Technology

The present invention relates to a rubber composition for tire tread and a tire produced using this rubber composition. More particularly, the invention relates to a rubber composition for tire tread which is capable of enhancing the cut and chip resistance performance without any deterioration of the abrasion resistance and heat generation resistance performances, and a tire produced using this rubber composition.

Description of the Related Art

Tread rubber is the only site that is in contact with the road surface among the tire parts, and the tread rubber transfers various forces applied to the tire, such as driving force, braking force and cornering force to the road surface and protects sites other than the tread rubber from external forces. Examples of the performance that is traditionally required from the tread rubber include crack resistance, abrasion resistance, heat resistance, and skid resistance. However, since it is generally very difficult to determine a rubber blend that satisfies the overall performance, a variety of tread rubbers have been developed so as to respectively cope with the various required performances according to the performance goals of various products.

The conventional cut and chip resistance enhancing technologies have been applied by using polymers, carbon black and the like, which are advantageous to the cut and chip resistance. Regarding such technologies, there is disclosed a technology of using a carbon black having a small particle size and a silica filler in combination with natural rubber, which is traditionally advantageous for the cut and chip resistance performance (Korean Patent Application Laid-Open No. 10-2013-0071057 (filed Jun. 28, 2013). However, this technology has a disadvantage that silica that has complicated blending conditions must be mixed in together. Thus, there is a problem that not only a silica blending technology but also technologies related to facilities operation should be acquired in advance. Furthermore, depending on the use of the silica that is added as a simple reinforcing agent for an enhancement of the cut and chip resistance performance, there may be a compromise of the heat generation resistance performance to some extent.

Regarding technologies different from this, there is disclosed a technology of applying various synthetic rubbers to the polymer-based system in which existing natural rubber only has been used, so that the crack resistance and the cut and chip resistance performance are deteriorated while the abrasion resistance performance and steering stability are improved (Korean Patent Application Laid-Open No. 10-2013-0019044 (filed 26 Feb. 2013). However, this technology also has a problem, from the viewpoint that the existing raw material rubber is changed, that modification of the main raw material and optimization of the mixing conditions should be achieved at the time of mass production of the final product.

SUMMARY OF THE DISCLOSURE

An object of the presently described embodiments is to provide a rubber composition for tire tread that is capable of enhancing the cut and chip resistance performance without any deterioration of the abrasion resistance and heat generation resistance performances.

Another object of the presently described embodiments is to provide a tire produced using the rubber composition for tire tread described above.

In order to achieve the objects described above, a rubber composition for tire tread according to an aspect of the present invention includes 100 parts by weight of a raw material rubber and 45 to 70 parts by weight of carbon black, while the carbon black includes 40 to 60 parts by weight of a first carbon black and 5 to 15 parts by weight of a second carbon black. The first carbon black has a statistical thickness surface area (STSA) value that is larger by 50 to 75 $m^2/g$ relative to that of the second carbon black, has an oil absorption number of compressed sample (COAN) value that is larger by 5 to 30 cc/100 g relative to that of the second carbon black, an oil absorption number of sample (OAN) value that is larger by 20 to 40 cc/100 g relative to that of the second carbon black, and has an iodine adsorption amount value that is larger by 50 to 70 mg/g relative to that of the second carbon black.

The raw material rubber may include 30 to 50 parts by weight of natural rubber, 20 to 40 parts by weight of a butadiene rubber, and 20 to 30 parts by weight of a styrene-butadiene rubber.

The first carbon black may be included in an amount of 45 to 55 parts by weight relative to 100 parts by weight of the raw material rubber, and the second carbon black may be included in an amount of 5 to 10 parts by weight relative to 100 parts by weight of the raw material rubber.

According to an embodiment, the first carbon black may have a STSA value of 130 to 140 $m^2/g$, a COAN value of 100 to 110 cc/100 g, an OAN value of 125 to 135 cc/100 g, and an iodine adsorption amount of 135 to 145 mg/g. At this time, the second carbon black may have a STSA value of 70 to 80 $m^2/g$, a COAN value of 85 to 95 cc/100 g, an OAN value of 95 to 105 cc/100 g, and an iodine adsorption amount of 75 to 85 mg/g.

According to another embodiment, the first carbon black may have a STSA value of 135 to 145 $m^2/g$, a COAN value of 85 to 95 cc/100 g, an OAN value of 95 to 105 cc/100 g, and an iodine adsorption amount of 135 to 145 mg/g. At this time, the second carbon black may have a STSA value of 70 to 80 $m^2/g$, a COAN value of 65 to 75 cc/100 g, an OAN value of 65 to 75 cc/100 g, and an iodine adsorption amount of 75 to 85 mg/g.

According to another aspect of the presently described embodiments, there is provided a tire produced using the rubber composition for tire tread described above.

DETAILED DESCRIPTION

The rubber composition for tire tread according to an embodiment of the present disclosure includes 100 parts by weight of a raw material rubber and 45 to 70 parts by weight of carbon black, the carbon black including 40 to 60 parts by weight of a first carbon black and 5 to 15 parts by weight of a second carbon black. The first carbon black has a STSA (statistical thickness surface area) value that is larger by 50 to 75 m²/g, a COAN (oil absorption number of compressed sample) value that is larger by 5 to 30 cc/100 g, an OAN (oil absorption number of sample) value that is larger by 20 to 40 cc/100 g, and an iodine adsorption amount that is larger by 50 to 70 mg/g, all relative to the same respective values of the second carbon black.

The raw material rubber may be any one selected from the group consisting of natural rubber, a synthetic rubber, and combinations thereof.

The natural rubber may be common natural rubber or a modified natural rubber.

Regarding the common natural rubber, any rubber known as natural rubber can be used, and there are no limitations on the place of production or the like. The natural rubber include cis-1,4-polyisoprene as a main component; however, the natural rubber may include trans-1,4-polyisoprene depending on the required characteristics. Therefore, the natural rubber may include a natural rubber having cis-1,4-polyisoprene as a main component, as well as a natural rubber having trans-1,4-isoprene as a main component, for example, gutta-balata which is a kind of rubber of the Sapota family manufactured by South America.

The modified natural rubber means a product obtained by modifying or purifying the common natural rubber. Examples of the modified natural rubber include epoxidated natural rubber (ENR), deproteinated natural rubber (DPNR), and hydrogenated natural rubber.

The synthetic rubber may be any one selected from the group consisting of a styrene-butadiene rubber (SBR), a modified styrene-butadiene rubber, a butadiene rubber (BR), a modified butadiene rubber, and combinations thereof.

According to another embodiment, the raw material rubber may include, in order to provide a tire tread for truck or bus having abrasion resistance and heat generation resistance performances and excellent cut and chip resistance performance, 30 to 50 parts by weight of natural rubber, 20 to 40 parts by weight of a butadiene rubber, and 20 to 30 parts by weight of a styrene-butadiene rubber.

The first carbon black may have a STSA (statistical thickness surface area) value that is larger by 50 to 75 m²/g relative to that of the second carbon black; a COAN (oil absorption number of compressed sample) value that is larger by 5 to 30 cc/100 g relative to that of the second carbon black; an OAN (oil absorption number of sample) value that is larger by 20 to 40 cc/100 g relative to that of the second black; and an iodine adsorption amount value that is larger by 50 to 70 mg/g relative to that of the second black. When carbon blacks that exhibit differences in the STSA, COAN, OAN and iodine adsorption amount to the extents described above are employed as the first and second carbon blacks, the cut and chip resistance can be enhanced while excellent abrasion resistance performance is maintained. Particularly, any two kinds of carbon blacks that exhibit differences in the STSA, COAN, OSA and iodine adsorption amount to the extents described above and are selected from conventionally used ASTM-grade carbon blacks can be used without limitations. Therefore, there are advantages that the existing tire production processes can be utilized without modification, it is not necessary to synthesize new fillers, and a tire having excellent performance can be provided in an economically efficient manner.

However, if the difference between the STSA values of the first carbon black and the second carbon black is less than 50 m²/g, the difference between the COAN values is less than 5 cc/100 g, the difference between the OAN values is less than 20 cc/100 g, or the difference between the iodine adsorption amounts is less than 50 mg/g, the synergistic effect of the two kinds of carbon blacks becomes negligible, and it is difficult to expect an improvement in the cut and chip performance. On the other hand, if the difference between the STSA values of the first carbon black and the second carbon black is more than 75 m²/g, the difference between the OAN values is more than 40 cc/100 g, or the difference between the iodine adsorption amounts is more than 70 mg/g, the abrasion resistance and heat generation resistance performances may be deteriorated. Also, if the difference between the COAN values of the first carbon black and the second carbon black is more than 30 cc/100 g, it may be disadvantageous in the hysteresis due to deterioration of the heat generation resistance performance.

The first and second carbon blacks can be used in an amount of 45 to 70 parts by weight relative to 100 parts by weight of the raw material rubber. If the content of carbon black is less than the range described above, the reinforcing function provided by carbon black may be deteriorated, and the abrasion resistance performance may be weakened. If the content of carbon black is more than the range described above, carbon black that is not bonded to rubber cannot be dispersed and may cause heat generation, thereby deteriorating the tire performance.

The first carbon black may be used in an amount of 40 to 60 parts by weight, and the second carbon black may be used in an amount of 5 to 15 parts by weight relative to 100 parts by weight of the raw material rubber. If the content of the first carbon black is more than 60 parts by weight, or the content of the second carbon black is less than 5 parts by weight, the mutual complementing function of the second carbon black having an excellent balance between tensile strength, modulus and elongation ratio may become negligible. Alternately, if the content of the first carbon black is less than 40 parts by weight, or the content of the second carbon black is more than 15 parts by weight, the influence of the carbon black having a lower structure and a narrower specific surface area compared with the filler that is added to the rubber composition for tire tread is increased, and the abrasion resistance and heat generation resistance performances may be deteriorated.

According to another embodiment, the first carbon black may be used in an amount of 45 to 55 parts by weight relative to 100 parts by weight of the raw material rubber, and the second carbon black may be used in an amount of 5 to 10 parts by weight relative to 100 parts by weight of the raw material rubber. When the first and second carbon blacks are used in amounts of these ranges, the cut and chip resistance performance can be highly enhanced while the abrasion resistance and heat generation resistance performances are maintained and improved to excellent levels. As a result, such a rubber composition for tire tread can provide a tire for truck or bus that is excellent not only in the primarily required properties such as abrasion resistance and heat generation resistance performances, but also in the secondarily required properties such as cut and chip resistance performance.

Regarding the first and second carbon blacks, in order to enhance the cut and chip resistance performance without any deterioration of the abrasion resistance and heat generation resistance performances, appropriate carbon blacks can be employed so that the tire tread may have a high modulus value in a low strain region and have a low modulus value in a high strain region.

According to another embodiment of the present disclosure, a carbon black having a STSA value of 130 to 140 $m^2/g$, a COAN value of 100 to 110 cc/100 g, an OAN value of 125 to 135 cc/100 g, and an iodine adsorption amount of 135 to 145 mg/g may be used as the first carbon black. In this case, a carbon black having a STSA value of 70 to 80 $m^2/g$, a COAN value of 85 to 95 cc/100 g, an OAN value of 95 to 105 cc/100 g, and an iodine adsorption amount of 75 to 85 mg/g may be used as the second carbon black.

Furthermore, according to another embodiment, a carbon black having a STSA value of 135 to 145 $m^2/g$, a COAN value of 85 to 95 cc/100 g, an OAN value of 95 to 105 cc/100 g, and an iodine adsorption amount of 135 to 145 mg/g may be used as the first carbon black. In this case, a carbon black having a STSA value of 70 to 80 $m^2/g$, a COAN value of 65 to 75 cc/100 g, an OAN value of 65 to 75 cc/100 g, and an iodine adsorption amount of 75 to 85 mg/g may be used as the second carbon black.

The rubber composition for tire tread may further selectively include various additional additives such as a vulcanizing agent, a vulcanization accelerator, a vulcanization acceleration aid, a filler, a coupling agent, an aging inhibitor, a softening agent, and a tacky adhesive. Regarding these various additives, any additives that are conventionally used in the art to which the present invention is pertained can be used, and the contents of these additives are not particularly limited as long as the contents conform to the mixing ratios used in conventional rubber compositions for tire tread.

According to another aspect of the present disclosure, there is provided a tire produced using the rubber composition for tire tread described above. Regarding the method for producing a tire using the rubber composition for tire tread, any method that is conventionally used in the production of tires can be applied, and further detailed explanation thereon will not be given in the present specification.

This tire may be a radial tire or a bias tire.

The rubber composition for tire tread of the present invention exhibits excellent cut and chip resistance, while still having excellent abrasion resistance performance and heat generation resistance performance that are in a trade-off relationship with the cut and chip resistance. Particularly, since the rubber composition for tire tread exhibits excellent abrasion resistance and excellent cut and chip resistance, a tire produced using the rubber composition for tire tread can be suitably used in buses and trucks.

EXAMPLES

Hereinafter, Examples of the presently described embodiments will be described in detail so that a person having ordinary skill in the art to which the present disclosure pertains can easily carry out the described embodiments. However, the presently described embodiments can be realized in various different forms, and are not intended to be limited to the Examples described herein.

Production Example

Production of Rubber Composition

Rubber compositions for tire tread according to the following Examples and Comparative Examples were produced using the compositions described in the following Table 1. Production of the rubber compositions was conducted in accordance with a conventional method for producing a rubber composition.

TABLE 1

|  | Example 1 | Example 2 | Comparative Example 1 | Example 3 | Example 4 | Comparative Example 2 |
| --- | --- | --- | --- | --- | --- | --- |
| Natural rubber | 50 | 50 | 50 | 50 | 50 | 50 |
| Butadiene rubber | 30 | 30 | 30 | 30 | 30 | 30 |
| Styrene-butadiene rubber | 20 | 20 | 20 | 20 | 20 | 20 |
| Carbon black A[1] | 50 | 40 | 55 | — | — | — |
| Carbon black B[2] | 5 | 15 | — | — | — | — |
| Carbon black C[3] | — | — | — | 50 | 40 | 55 |
| Carbon black D[4] | — | — | — | 5 | 15 | — |
| Zinc oxide | 2 | 2 | 2 | 2 | 2 | 2 |
| Stearic acid | 1 | 1 | 1 | 1 | 1 | 1 |
| Aging inhibitor(6PPD) | 1 | 1 | 1 | 1 | 1 | 1 |
| Sulfur | 2 | 2 | 2 | 2 | 2 | 2 |
| Vulcanization accelerator | 1 | 1 | 1 | 1 | 1 | 1 |

(unit: parts by weight)
[1]Carbon black A: Carbon black having a STSA value of 130 to 140 $m^2/g$, a COAN value of 100 to 110 cc/100 g, an OAN value of 125 to 135 cc/100 g, and an iodine adsorption amount of 135 to 145 mg/g
[2]Carbon black B: Carbon black having a STSA value of 70 to 80 $m^2/g$, a COAN value of 85 to 95 cc/100 g, an OAN value of 95 to 105 cc/100 g, and an iodine adsorption amount of 75 to 85 mg/g
[3]Carbon black C: Carbon black having a STSA value of 135 to 145 $m^2/g$, a COAN value of 85 to 95 cc/100 g, an OAN value of 95 to 105 cc/100 g, and an iodine adsorption amount of 135 to 145 mg/g
[4]Carbon black D: Carbon black having a STSA value of 70 to 80 $m^2/g$, a COAN value of 65 to 75 cc/100 g, an OAN value of 65 to 75 cc/100 g, and an iodine adsorption amount of 75 to 85 mg/g Experimental Example Measurement of Properties of Rubber Compositions Produced Rubber sheets were produced by blending the rubber compositions produced in the Examples and Comparative Examples using a Banbury mixer, and basic properties such as the tensile strength after vulcanization and viscoelasticity, and the cut and chip resistance were evaluated. The results are presented in the following Table 2.

TABLE 2

| | Example 1 | Example 2 | Comparative Example 1 | Example 3 | Example 4 | Comparative Example 2 |
|---|---|---|---|---|---|---|
| Hardness | 70 | 69 | 70 | 75 | 72 | 73 |
| 10% Modulus (MPa) | 11.3 | 11.2 | 9.6 | 13.7 | 12.6 | 11.8 |
| 300% Modulus (MPa) | 142 | 144 | 159 | 103 | 109 | 123 |
| Heat generation resistance index | 100 | 98 | 100 | 104 | 101 | 100 |
| Cut and chip resistance index | 109 | 108 | 100 | 120 | 123 | 100 |
| Abrasion resistance index | 99 | 94 | 100 | 101 | 99 | 100 |

(1) Hardness (Shore A) was measured according to DIN 53505. The hardness is a value indicating steering stability, and a higher value thereof indicates superior steering stability.

(2) The 10% modulus and 300% modulus were measured by cutting a rubber specimen into a dumbbell shape and using a tensile testing machine (manufactured by Instron, inc.). The 10% modulus means the stress acting on the specimen when the specimen is elongated by 10%, and the 300% modulus means the stress acting on the specimen when the specimen is elongated by 300%. As the modulus in a low strain region is larger, and as the modulus in a high strain region is smaller, it is more advantageous in the cut and chip resistance.

(3) The heat generation resistance index is the result of an evaluation performed using an indoor durability testing machine. The values of Examples 1 and 2 are expressed as indices relative to the value of Comparative Example 1 as 100, and the values of Examples 3 and 4 are expressed as indices relative to the value of Comparative Example 2 as 100. A higher heat generation resistance index indicates superior heat generation resistance.

(4) The cut and chip resistance index was obtained by applying impacts with a sharp blade to a rotating rubber specimen at a constant period and a constant force and measuring the difference of the weights of the specimen measured before test and after the test. The values of Examples 1 and 2 are expressed as indices relative to Comparative Example 1 as 100, and the values of Examples 3 and 4 are expressed as indices relative to Comparative Example 2 as 100. A higher cut and chip resistance index indicates superior cut and chip resistance performance.

(5) The abrasion resistance index was measured using an LAT-100 abrasion testing machine, and a higher abrasion resistance index indicates superior abrasion resistance.

According to the results in Table 2, it was confirmed that in Examples 1 and 2 that used two kinds of carbon blacks combined to have a higher low-strain modulus and a lower high-strain modulus, the cut and chip resistance was enhanced compared with Comparative Example that used a single kind of carbon black.

Furthermore, Examples 3 and 4 also exhibited highly enhanced cut and chip resistance compared with Comparative Example 2, while having the heat generation resistance or abrasion resistance performance maintained or improved to an excellent level.

On the other hand, when Examples 1 and 3 are compared, and Examples 2 and 4 are compared, it was confirmed that even if two kinds of carbon blacks are used, when the content of use of a carbon black having a low structure, for example, carbon black B or D, is increased, the heat generation resistance and abrasion resistance performances may be deteriorated. Therefore, it could be confirmed that the mixing ratio of the two kinds of carbon blacks is very important.

Preferred embodiments of the present disclosure have been described in detail in the above, but the scope of rights of the present disclosure is not intended to be limited thereto, and various modifications and improvements made by those having ordinary skill in the art by utilizing the basic inventive concept of the present disclosure as defined in the following claims are also included in the scope of rights of the present disclosure.

What is claimed is:

1. A rubber composition for tire tread, the rubber composition comprising 100 parts by weight of a raw material rubber and 45 to 70 parts by weight of carbon black,
    the carbon black including 40 to 60 parts by weight of a first carbon black, and 5 to 15 parts by weight of a second carbon black,
    wherein the first carbon black has a statistical thickness surface area (STSA) value that is larger by 50 to 75 m$^2$/g relative to that of the second carbon black; an oil absorption number of compressed sample (COAN) value that is larger by 5 to 30 cc/100 g relative to that of the second carbon black; an oil absorption number of sample (OAN) value that is larger by 20 to 40 cc/100 g relative to that of the second carbon black; and an iodine adsorption amount value that is larger by 50 to 70 mg/g relative to that of the second carbon black; the first carbon black has a STSA value of 135 to 145 m$^2$/g, a COAN value of 85 to 95 cc/100 g, an OAN value of 95 to 105 cc/100 g, and an iodine adsorption amount of 135 to 145 mg/g; and the second carbon black has a STSA value of 70 to 80 m$^2$/g, a COAN value of 65 to 75 cc/100 g, an OAN value of 65 to 75 cc/100 g, and an iodine adsorption amount of 75 to 85 mg/g.

2. The rubber composition for tire tread according to claim 1, wherein the raw material rubber comprises 30 to 50 parts by weight of natural rubber, 20 to 40 parts by weight of a butadiene rubber, and 20 to 30 parts by weight of a styrene-butadiene rubber.

3. The rubber composition for tire tread according to claim 1, wherein the first carbon black is included in an amount of 45 to 55 parts by weight relative to 100 parts by weight of the raw material rubber, and the second carbon black is included in an amount of 5 to 10 parts by weight relative to 100 parts by weight of the raw material rubber.

4. A tire produced using the rubber composition for tire tread according to claim 1.

* * * * *